United States Patent [19]

Iobst et al.

[11] Patent Number: 5,396,641
[45] Date of Patent: Mar. 7, 1995

[54] RECONFIGURABLE MEMORY PROCESSOR

[76] Inventors: Kenneth W. Iobst, 18 Windmill Ct., Silver Spring, Md. 20904; David R. Resnick, 2006 Black Ave., Eau Claire, Wis. 54703; Kenneth R. Wallgren, 7225 Talisman La., Columbia, Md. 21045

[21] Appl. No.: 73,978

[22] Filed: Jun. 8, 1993

Related U.S. Application Data

[62] Division of Ser. No. 643,633, Jan. 18, 1991, abandoned.

[51] Int. Cl.[6] .............................. G06F 13/00
[52] U.S. Cl. ...................... 395/800; 364/131; 364/133; 364/134; 364/228.1; 364/229; 364/229.4; 364/230.5; 364/230.6; 364/232.9; 364/DIG. 1
[58] Field of Search ............... 395/800, 200, 275, 325; 364/DIG. 1, DIG. 2, 131, 133, 134, 228.1, 229, 229.4, 230.5, 230.6, 232.9

[56] References Cited

U.S. PATENT DOCUMENTS

| | | | |
|---|---|---|---|
| 4,302,818 | 11/1981 | Niemann | 364/736 |
| 4,760,517 | 7/1988 | Miller et al. | 395/800 |
| 4,760,525 | 7/1988 | Webb | 395/800 |
| 4,791,560 | 12/1988 | Lahti et al. | 395/375 |
| 4,823,259 | 4/1989 | Aichelmann, Jr. et al. | 395/425 |
| 4,849,882 | 7/1989 | Aoyama | 395/800 |
| 4,888,682 | 12/1989 | Ngai et al. | 395/800 |
| 5,001,671 | 3/1991 | Koo et al. | 365/230.05 |
| 5,010,477 | 4/1991 | Omoda et al. | 395/800 |
| 5,146,608 | 9/1992 | Hillis | 395/800 |
| 5,203,002 | 4/1993 | Wetzel | 395/800 |

OTHER PUBLICATIONS

Morton, Steven G., "Building Neurocomputers", Electronic Engineering Times, Mar. 20, 1989, pp. T12–13.
Morton, Steven G., "Intelligent Memory Chips", Defense Computing, Nov.–Dec. 198?, pp. 14–17.
Cushman, Bob, "Matrix Crunching With Massive Parallelism", VLSI Systems Design, Dec. 1988, pp. 18–31.
"Giving Brainy Computers Cooler Heads", Business Week, Mar. 6, 1989, p. 103.
"Intelligent Memory Chip Competes With Optical Computing", Laser Focus World, Apr. 1898, pp. 163–164.

*Primary Examiner*—Alyssa H. Bowler
*Assistant Examiner*—Dzung C. Nguyen
*Attorney, Agent, or Firm*—Laubscher & Laubscher

[57] ABSTRACT

A process in memory chip has been designed to combine memory and computation on the same integrated circuit in a way that makes use of the bandwidth that results from the combination. The chip contains multiple single-bit computational processors that are all driven in parallel. Error correction logic is also incorporated into the chip to detect and correct errors in memory, data as they occur.

10 Claims, 4 Drawing Sheets

RECONFIGURABLE MEMORY PROCESSOR

This application is a division of application Ser. No. 07/643,633, filed Jan. 18, 1991 now abandoned.

BACKGROUND OF THE INVENTION

Research on a Parallel SIMD Simulation Workbench (PASSWORK) has demonstrated that multiple instruction multiple data (MIMD) vector machines can simulate a nearly full speed the global routing and bit-serial operations of commercially available single instruction multiple data (SIMD) machines. Hardware gather/scatter and vector register corner-turning are key to this kind of high performance SIMD computing on vector machines as disclosed in the pending Iobst U.S. patent application Ser. No. 533,233 and titled Apparatus for Performing a Bit Serial Orthogonal Transformation Instruction. In a direct comparison between vector machines and SIMD machines, the only other significant limits to SIMD performance are memory bandwidth and the multiple logical operations required for certain kinds of arithmetic, i.e. full add on a vector machine or tallies across the processors on a SIMD machine. Results of this research suggest that a good way to support both MIMD and SIMD computations on the same shared memory machine is to fold SIMD into conventional machines rather than design a completely new machine.

Even greater SIMD performance on conventional machines may be possible if processors and memories are integrated onto the same chip. More specifically, if one were to design a new kind of memory chip (a process-in-memory chip or PIM) that associates a single-bit processor with each column of a standard random access memory (RAM) integrated circuit (IC), the increase in SIMD performance might be several orders of magnitude. It should also be noted that this increase in performance should be possible without significant increases in electrical power, cooling and/or space requirements.

This basic idea breaks the non-Neumann bottleneck between a central processing unit (CPU) and memory by directly computing in the memory and allows a natural evolution from a conventional computing environment to a mixed MIMD/SIMD computing environment. Applications in this mixed computing environment are just now beginning to be explored.

The present invention relates to a PIM chip which combines memory and computation on the same integrated circuit that maximumizes instruction/data bandwidth between processors and memories by eliminating most of the need for input/output across data pins. The chip contains multiple single-bit computational processors that are all driven in parallel and encompasses processor counts from a few to possibly thousands on each chip. The chips are then put together into groups or systems of memory banks that enhance or replace existing memory subsystems in computers from personal computers to supercomputers.

SUMMARY OF THE INVENTION

Accordingly, it is a primary object of the present invention to provide a process-in-memory (PIM) chip which starts with a standard memory array that is changed so that all of the data that is read on one row reference is sent to a set of bit-serial processors wherein one bit of the row is associated with one bit-serial processor. When the processors have a result to be written back into the memory, all result bits, one per processor, are written at the same time. Because memory is accessed in this parallel manner, single error correction double error detection (SECDED) capability is added to insure proper operation or as a notification of improper operation. Because performance is important, the execution sequence overlaps the loading and storing of memory data with the processing of other data. An R register is added to implement this pipelining.

The PIM chip can perform in two modes. To the external world the IC can be used as a normal read/write memory. Capability is added through the computational processors and added control lines to have the processors compute a result in place of a memory access cycle (either read or write). When the PIM chip is used for computation (PIM mode), an address is presented to the row decoder from the chip pins. As a result, a row of data is fetched from the memory. The data is error corrected and then latched into the R register at the end of the clock cycle/beginning of the next clock cycle. In the next clock cycle, the processors use the data as part of the computational sequence under control of external command/control lines. If a computed result is to be stored into memory from the processors, the memory load cycle is replaced with a store cycle. Error correction check bits are added to the store data on its way to the memory array.

There are two communication networks added to the processors to facilitate the flow of data between the multitude of processors and also from the multitude of processors to one or more levels of off chip control. These networks are known as the Global-Or network (GOR) and the Parallel Prefix network (PPN).

When the chip is being used for normal writing, data is first read from memory, error corrected, and then merged with the write data before being placed into the R register. The content of the R register with the modified data is then routed back through the error correction logic on its way to memory. This is required because the number of bits coming on to the chip through the write port is less than the amount of data written to memory. This merge pass allows proper error correction information to be regenerated for the words being written. When used for normal reads, a row of data is taken from memory, error corrected and placed into the R register. In the next clock cycle, address bits choose the proper subset of bits to be sent off chip.

According to a further object of the invention, a method for controlling a memory bank of PIM chips is provided through address and data buses. In normal read/write mode, a bank of PIM chips receive row and column addresses on the address bus and read/write data on the data bus. In PIM mode, a bank of PIM chips receive a row address on the address bus and a SIMD instruction to be executed on the data bus. Optionally, the SIMD instruction can be sent on the unused column address lines of the address bus. In this way, sequences of SIMD instructions can be fully pipelined with overlapping memory references and operations across all processors.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
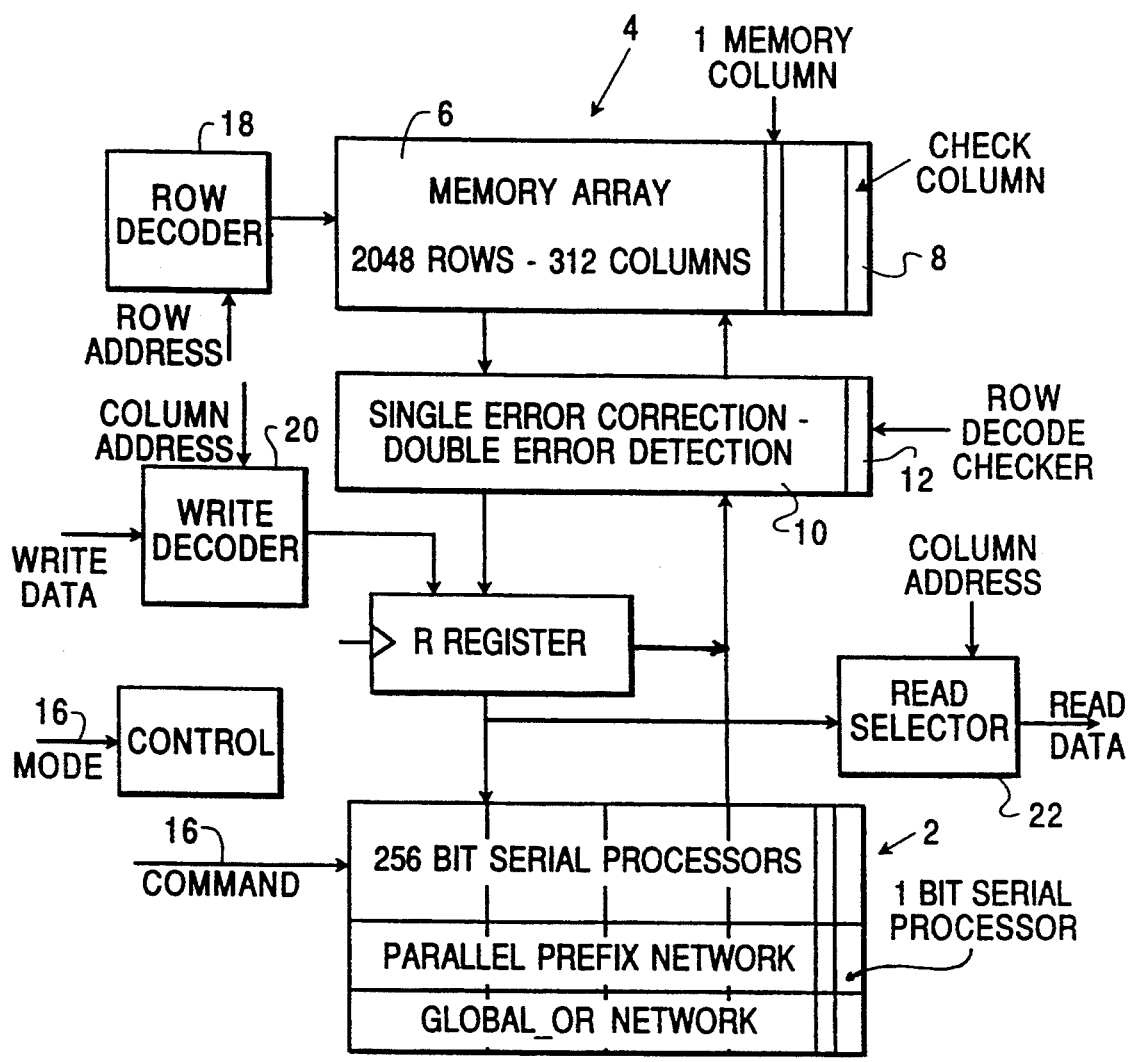
FIG. 1 is a block diagram of the PIM chip according to the invention.

Referring first to FIG. 1, the architecture of the process-in-memory (PIM) circuit will be described. The basic components of the circuit are bit-serial processors 2 with an attached local memory 4. The local memory can move one bit to or from one bit-serial processor during each clock cycle through error correction circuit (ECC) logic. (Thus the clock rate for a PIM design is set by the memory access plus the ECC time). Alternatively, the memory can do an external read or write during each clock, again, after being processed through the ECC logic. There is also added logic to provide communication paths between processor elements on chip and between chips.

The memory associated with a bit-serial processor is viewed as a memory column one bit wide. The columns are catenated together forming a memory array 6. A set of bit serial processors are similarly catenated together and are normally viewed as sitting functionally below the memory array. This means that a single row address to the memory array will take or provide one bit to each of the bit-serial processors, all in parallel. All memory accesses, internal and external references and both read and write operations are parallel operations. This means that during a PIM instruction, the column address bits are unused. The normal column decoders and selectors for external references are moved to allow for the difference in chip architecture and for ECC processing and the resultant change in timing. The memory array also includes an extra check column 8 as will be developed in greater detail below.

Arranged between the memory array 6 and the processors 2 in an error detection and correction circuit 10 including a row decode checker 12 which will be discussed in greater detail below.

An R register 14 is provided between the error detection and correction circuit 10 and the processors 2 to implement pipelining to overlap the loading and storing of memory data with the processing of other data.

The PIM chip can perform in two modes: as a normal read/write memory or for computation (PIM mode). Capability is added through computational processors 2 and added control lines 16 to have the processors compute a result in place of a memory access cycle.

When the chip is used for computation, an address is presented to the row decoder 18 from the chip pins. As a result, a row of data is fetched from the memory. The data is error corrected and latched into the R register at the end of the clock cycle/beginning of the next clock cycle. In the next clock cycle, the processors use the data as part of the computational sequence under control of the external control and command lines 16. If a computed result is to be stored into memory from the processors, the memory load cycle is replaced with a store cycle. Error correction data is added to the store data on its way to the memory array.

When the chip is being used for normal writing, data is first read from memory 4, error corrected, and then merged with the write data from the write decoder 20 before being placed into the R register 14. The contents of the R register with the new data is then routed back through the error correction logic on its way to memory. This is required because the number of bits coming onto the chip through the write port is less than the amount of data written to memory. This merge pass allows proper error correction information to be regenerated for the words being written.

When used for normal reads, a row of data is taken from memory, error corrected and placed into the R register. In the next clock cycle, column address bits choose the proper subset of bits to be sent off chip from the read selector 22.

In the illustrated embodiment, there are 256 processors, which when SECDED checkbyte columns are added, give a total of 312 columns in the memory array. Each column is expected to be 2K bits tall. Thus, the memory will contain $2048 \times 312 = 638,976$ (624K) bits. There is no requirement that the memory array physically be built in this configuration as others will work as well.

Each processor on a PIM chip is a bit-serial computation unit. All processors are identical and are controlled in parallel; that is, all processors perform the same operation, all at the same time, all on different data. The processors thus implement a SIMD computation architecture.

Figure 2:
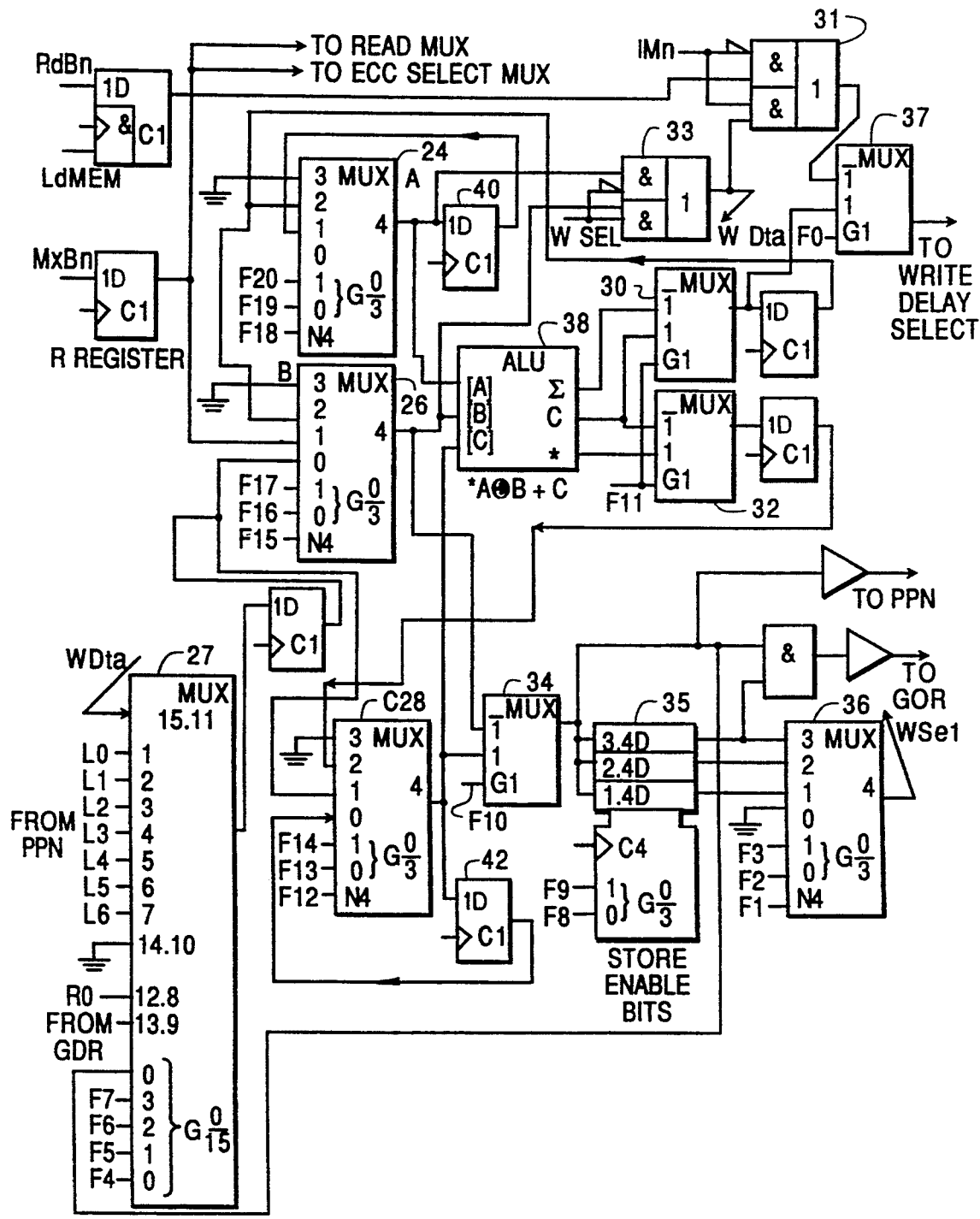
FIG. 2 is a schematic view of a bit-serial processor of the PIM chip of FIG. 1.

Referring now to FIG. 2, one bit-serial processor will be described in greater detail. The processor includes several multiplexers 24, 26, 27, 28, 30, 31, 32, 33, 34, 36, 37 feeding a fixed function arithmetic logic unit (ALU) 38 including means to conditionally propagate the results of computations to other processors or to memory.

The ALU 38 takes three input signals called A, B, and C and computes three fixed functional results of the three inputs. The results are Sum ($A \oplus B \oplus C$), Carry ($A.B + A.C + B.C$) and String Compare ($C + A \oplus B$). Using the capabilities of the multiplexers, a full set of logic operations can be implemented from the Carry function. For example, by blocking the C input (force C=0 the AND of A and B can be computed and by forcing the C input (make C=1) the OR of A and B can be computed.

Several multiplexers choose the data paths and functions within the processor. Data sources that drive the multiplexers come from memory, other processors via internal communication networks, or internally generated and saved results.

There are three primary multiplexers 24, 26, 28 which feed the A, B, and C inputs of the ALU. Each of the multiplexers is controlled by separate control/command lines. In the drawing, control lines are shown as Fn where n is a number from 0 to 20. All control lines originate off chip. Each of the multiplexers 24, 26, 28 are driven by three separate control lines. Two of the lines are decoded to select one of four inputs while the third control line inverts the state of the selected signal. The first multiplexer 24 can select, under control of the control lines, the previous output of the multiplexer 24 from the last clock cycle (this state saved by a flip-flop 20 associated with the multiplexer 24, the data just being read from memory, either the Sum or Carry result from the ALU where the selection between these two signals is made by another multiplexer driven by another control/command line, and logic zero. Any of these signals can be routed to the A input of the ALU, possibly inverted, on any clock cycle.

The second multiplexer 26 has the same data inputs as the first multiplexer 24 except that the first input is from a second level multiplexer 27 which selects from various communications paths or returns some previously calculated results. The control lines are separate from the control lines to the first multiplexer though they serve identical functions. Just as for the first multiplexer, data sent to the ALU can be inverted as required.

The third multiplexer 28 can select from the previous output of the third multiplexer from the last clock cycle (this state saved by a flip-flop 42 associated with the third multiplexer, the same communication multiplexer 27 that feeds the second multiplexer 26, either the Carry or String Compare result from the ALU where the selection between these two signals is made by another multiplexer driven by another control/command line, and logic zero. The selected datum, possibly inverted, is sent to the ALU under control of three separate control lines.

Any SIMD machine needs a mechanism to have some processors not perform particular operations. The mechanism chosen for PIM is that of conditional storage. That is, instead of inhibiting some processors from performing a command to have all processors perform the command but not store the result(s) of the computation. To perform this kind of conditional control, three flip-flops 35 are added to the processor along with multiplexers 31, 33, 36 and 37. On any cycle the multiplexer can choose any of the three or can choose a logic zero. Just as in the previous multiplexers, the state of the selected input can be inverted. Thus, for example, selecting the logic zero as input, can force the output to logic one by causing the inverted signal/command to be active.

The SIMD instruction sequence being executed, loads the old data from memory into the flip-flop associated with the A multiplexer and routes the computed result from the ALU through the B multiplexer. If multiplexer 33 that is fed by the multiplexer 36 is outputting a logic one, B data is gated to the memory store path; otherwise, the data from the A multiplexer is gated.

Data is loaded into the store enable flip-flops 35, in general, from data loaded from memory through the multiplexer 26 or from the ALU as a computed result through multiplexers 26 or 28. A command line chooses one result or the other through another multiplexer 34 and further command lines choose which (if any) store enable bits 35 to load.

Data can be routed from each processor to networks that provide communication between the processors on and off the PIM chip. There are two different networks called the Global-Or network (GOR) and the Parallel Prefix network (PPN). GOR serves to communicate in a Many-to-One or One-to-Many fashion while PPN serves to allow Many-to-Many communication.

Data sent to GOR is gated with one of the store enable bits 35. This allows a particular processor to drive the GOR network by having that processor's store enable bit be a logic one while the other processors have a logic zero enable bit.

Figure 3:
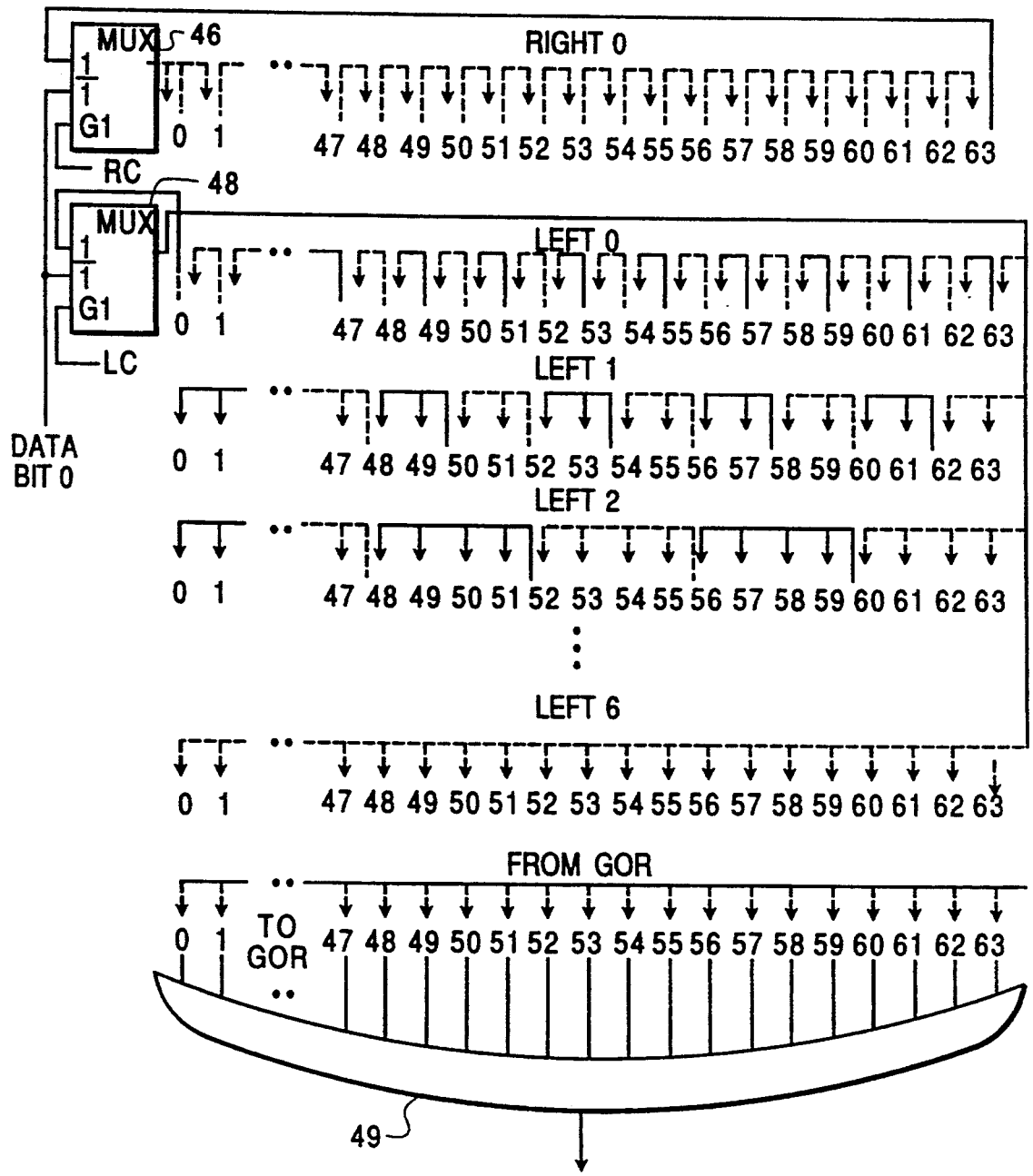
FIG. 3 is a diagram illustrating the global-or/parallel prefix network of the PIM chip of FIG. 1.

Alternatively, all processors on chip can drive the GOR network and provide the global-or of all processors back to individual processors or to a higher level of off chip control. The on chip global-or across all processors is performed through the multilevel OR gate 49 (FIG. 3).

Data from both the GOR and PPN networks are selected by another multiplexer 27 controlled by separate command lines. This data can be selected by either (or both) of the second and third multiplexers 26, 28.

The parallel prefix network will be described with reference to FIG. 3. This network derives its name from the mathematical function called scan or parallel prefix. The network of FIG. 3 implements this function in a way that allows for a great deal of parallelism to speed up parallel prefix across any associative operator.

The prefix operation over addition is called scan and is defined as:

$$X_i = X_{i-1} + Y_i \text{ for } i = 1 \text{ to } n, X_0 = 1$$

or $$X_1 = Y_1$$

$$X_2 = X_1 + Y_2$$

$$X_3 = X_2 + Y_3$$

$$X_4 = X_3 + Y_4$$

Note the chaining of the operations. When stated this way, each result depends on all previous results. But the equations can be expanded to:

$$X_1 = Y_1$$

$$X_2 = Y_1 + Y_2$$

$$X_3 = Y_1 + Y_2 + Y_3$$

$$X_4 = Y_1 + Y_2 + Y_3 + Y_4$$

Each processor starts with a single data item $Y_1$ through $Y_n$. The PPN allows the processor holding the copy of $Y_2$ to send its data to the processor holding $Y_1$ and at the same time allows the processor holding $Y_4$ to send its data to the processor holding $Y_3$, etc. Each processor will perform the required operation on the data (addition, in this example) and will then make the partial result available for further computation, in parallel with other similar operations, until all processors have a result—$X_1$ in processor one, $X_2$ in processor two, etc.

By implementing this network in hardware and then using it for general processor communication, two benefits are obtained. First the network allows some functions to be done in a parallel manner that would otherwise be forced into serial execution and, second the network can be implemented very efficiently in silicon, taking little chip routing space for the amount of parallelism achieved.

The network is implemented at all logarithmic levels across the processors. The first level allows processors to send data one processor to the left while receiving data from the processor on its right. The next level allows specific processors to send data to the next two processors on the left. Succeeding levels double the number of processors receiving the data while cutting in half the number of processors sending data. All processors receive data from all levels. Control lines whose state is controlled by an executing program running externally choose the required level. All processors select the same level.

There are some extensions from a base implementation of PPN. Thus, the connections required to make a level complete are implemented. That is, for example, at level 0 the even numbered processors can send data to the processor on their left even though that is not required by the PPN function. In addition, another level 0 is added to the PPN network which implements data motion in the reverse direction, i.e. to the right. Furthermore, multiplexers 46 and 48 are added to the end of the move data right and left connections that enable communication to be done in an extended mode or in a circular mode. In the circular mode the last processor on chip drives the first processor (and the first drives the last for data moving in the other direction). In the extended mode, the end processors receive data from off chip. This lets communications networks be built that are larger than one chip.

Figure 4:
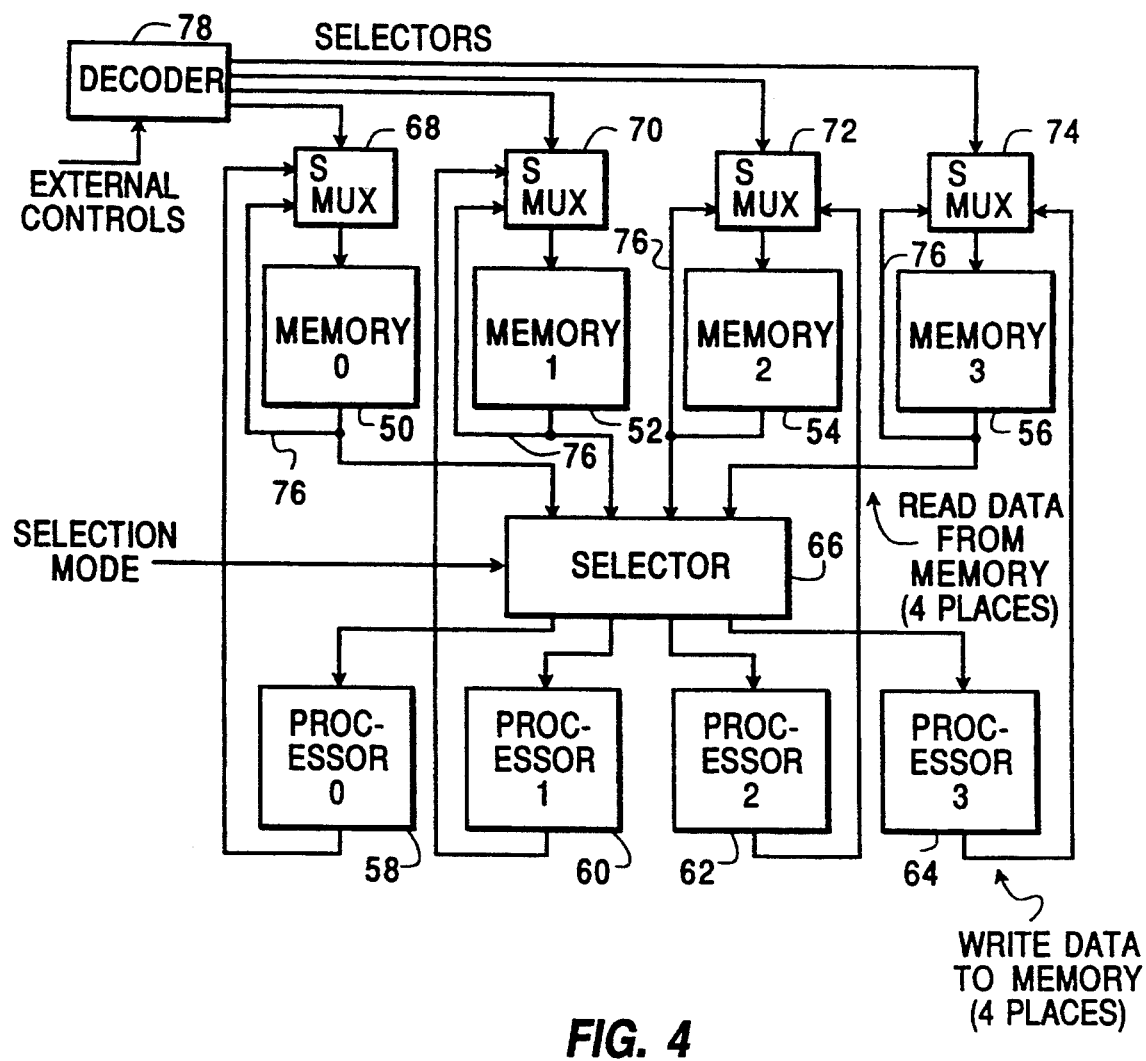
FIG. 4 is a block diagram of a reconfigurable memory processor for column reduction of the memory array.

Because of the number of processors and limits set by a maximum practical chip size, the amount of memory available to each processor is limited. Also there will be programs and algorithms that will not be able to make full use of the available number of processors. An attempt to solve both problems at the same time is referred to as column reduction which will now be described in connection with FIG. 4.

Processors are grouped together so that the formerly private memory for each processor is shared among the group. Additional control lines which serve as additional address lines route requested data from a particular memory column to all processors within the group. Each processor within the group thus computes on the same data (remember that all processors, whether part of the group or not all perform the same function). When data is to be stored, the processor that corresponds with the address of the data to be stored is enabled to send the newly computed result to memory while the processors within the group that do not correspond to the store address, copies back the old data that was previously fetched from the store address.

More particularly, a plurality of memory devices 50, 52, 54, 56 have processors 58, 60, 62, 64 associated therewith, respectively. A first selector 66 connects the outputs of the memory devices with the inputs of the processors so that each processor receives as an input the output from one of the memories. A plurality of multiplexers 68, 70, 72, 74 connect the outputs of each processor with the input of the memory device associated therewith. The output of each memory is also connected with the associated multiplexer through a feedback line 76. A decoder 78 controls the multiplexers 68, 70, 72, 74 to select as an input to the memories one of the memory and processor outputs. Thus, the plurality of processors is effectively reduced to a single processor and the amount of memory available to the single processor is increased by a factor of the number of memories.

A plurality of the memory devices and processors can be arranged in a group which includes a single selector and a single decoder.

The implementation discussed above could be replaced with logic that routes all the memory from a process group to one processor and the routes the result from that processor back to the right store address. This implementation, while functionally correct, introduces extra timing skew into the logic path and would greatly complicate implementation of conditional storage of data discussed above.

Replacing normal, external, error correction is a set of internal SECDED blocks that correct all data being read from memory (including external reads) and generate checkbytes for all data being written to memory (again, including external reads) and generate checkbytes for all data being written to memory (again, including external writes). SECDED is implemented as a repeated set of 39 bit groups—32 data bits and 7 checkbits. The data bits have associated bit serial processors while the checkbits do not. Pairs of 39 bit groups have their bits interleaved. Thus in a 78 bit group (78=2(32+7)) the even numbered bits are associated with one SECDED group while the odd numbered bits are associated with another. This means that errors like adjacent shorted bit lines will be seen as two single recoverable errors instead of as a double-bit unrecoverable error. As a trade-off, interleaved 72 bit groups could be considered. A memory group would be 144 columns (144=2(64+8)). There would be two memory groups (instead of the four proposed groups) for a total of 288 columns instead of 312.

There is also some other on-chip error detecting logic. The parity of both received data and addresses are separately checked on receipt as is the parity of the SIMD command. The parity of read data from the chip is sent along with the data. There is also an accessed row parity check. The parity of the row portion of the received address is compared to the contents of a special memory column whose contents are the parity of the row actually accessed. Any error detected by any parity or SECDED failure is set into chip status registers. Chip status may be ascertained through the normal read path or may be accessed through the chip maintenance port.

External read and write timing is affected by the error correction logic. On a read operation, data is read from memory, error corrected, and then put into the R register. The first two address bits are resolved on the way into this register. On a second cycle the addressing selection is completed and data is driven off the part. The addressing and data paths are such that the 64 data columns of an interleaved SECDED group drive one data bit on and off chip.

For external writes, the word at the read address is read, error corrected and then merged with the four write bits into the R register. On the next clock cycle, checkbits are generated from the data held in the register and the whole 312 bits are written. There are registers that hold the external address valid from the second memory cycle so that data and address at the chip pins need only be valid for one clock period.

The last two paragraphs point out that a PIM chip presents a synchronous interface to the outside world. In the case of reading, data becomes valid after the second clock edge from the clock that starts the read operation. At least at the chip level, a new read cycle can be started every clock except that if there is a data error it is desirable to write the corrected data back to memory which would then take another clock cycle. In the write case, the chip is busy for two clock cycles even though data does not need to be valid for both cycles. Of course there is nothing here that should be taken to imply that the PIM chip clock has the same clock rate as that of the remainder of the computer system.

In addition, the PIM chip has several error detection mechanisms. They include:

Data Parity Detect and Generate. A fifth bit accompanies the four bit data interface on both reads and writes.

Address Parity. A parity bit is checked for every received address whether for an external read or write for a PIM mode reference.

Command Parity. A parity bit is checked on every SIMD command.

Row parity. A special column is added to the memory array whose contents are the parity of the referenced row. This bit is compared to the parity of the received row address. Nothing changes here for column reduction mode.

All these errors along with single-bit and multiple-bit errors detected by the SECDED logic are put into PIM status flip-flops. These may be read through the normal memory access lines or may be read through the chip maintenance port.

The maintenance port is to be JTAG/IEEE 1149.1. In addition to chip status, some chip test information will be accessed through this port.

There are various bits buried in the chip for control of some of the data paths and to implement some diagnostic features that would otherwise be very difficult (or impossible) to test. Control bits are provided for turning off checkbyte generation. This allows checking the SECDED logic. What is done is to force the write checkbytes to the same value as would be generated on an all zero data word. Control bits also allow for inserting the compare within the row parity logic. Any PIM reference should then set the row parity error status bit. Other bits provide for PPN data routing.

In summary, the method for detecting system errors at the memory chip level includes the steps of detecting parity errors on multibit interfaces coming on to the chip and retaining the state of each of the detected parity errors. The errors of the memory array row decoder circuitry are next detected and the state of the errors is retained. Single bit memory errors are detected and corrected and double bit memory errors are detected and the states thereof are retained.

A row of memory devices is subdivided into correction subgroups, each of which comprises a plurality of columns, the alternate columns being connected with separate error detection correction circuits. The error states from the chip are then read and simultaneously cleared. The single bit error state and the multibit error state are separately maintained for maintenance purposes.

PIM mode execution is very similar to ordinary read/write control in that the R/W line is used to distinguish whether the memory reference is a read or a write. In the PIM read mode, the address lines are used for control and the data lines are used to return status/control information to the CPU (one bit per PIM data line). In the PIM write mode, the data lines are used for PIM control and the address lines are used to specify row select across the processors.

A method for efficient instruction decode and execution of basic code segments on a process in memory chip is also contemplated. In accordance with the method, incoming command, address, and data information is stored in separate pipelines. The information is accessed at a first appropriate time in accordance with the command information to perform a higher level function defined by a command sequence. The information is operated on by an arithmetic logic unit to create an output result that re-enters the data pipeline. The data and address pipelines are accessed at a second appropriate time in accordance with the command information to store this information in memory.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. A dynamically reconfigurable memory processor, comprising
   (a) a plurality of memory devices, each having an input and an output;
   (b) a plurality of first processors associated with said memory devices, respectively, each of said processors having an input and an output;
   (c) first selector means connecting the outputs of said memory devices with the inputs of said first processors, whereby an input to each first processor comprises an output from one of said memory devices;
   (d) second selector means connecting the output of each of said first processors with the input of the memory device associated with said first processor, the output of each memory device further being connected with said second selector means, said second selector means comprising a plurality of multiplexers connected with said plurality of memory devices, respectively;
   (e) decoder means for controlling said second selector means to select as an input to said memory devices one of said memory device and first processor outputs; and
   (f) a plurality of said memory devices and said first processors are arranged in a group, said group including a single first selector means and a single decoder which are operable to reconfigure said group of memory devices and first processors between a first mode of operation wherein a single memory device is available to any number of said plurality of first processors and a second mode of operation wherein any number of said plurality of memory devices in said group is available to a single processor, whereby the plurality of first processors is effectively reduced to a single processor and the amount of memory available to the single processor is increased by a factor of the number of memory devices.

2. Apparatus as defined in claim 1, and further comprising a network for implementing a generalized parallel prefix mathematical function across an arbitrary associative operator, including
   (a) means defining a plurality of successive levels of communication, a first level being zero;
   (b) means defining a plurality of successive groups of second processors within each of said levels, each group comprising $2^l$ second processors where l is the level number;
   (c) each second processor within a group having associated therewith a single input comprising an output from a preceding group, whereby a sequence of instructions is issued corresponding to the levels from level zero through level l to compute a parallel prefix of $2^l$ values;
   (d) the inputs in level one and subsequent levels being associated with a single second processor per group that has received all of the previous inputs.

3. Apparatus as defined in claim 2, wherein said groups within a level are arranged in sequential pairs, with one group of each pair sending data to the other group of said pair to define a mathematical operation of the parallel prefix.

4. Apparatus as defined in claim 2, wherein the output from a last group of a level of groups can selectively drive the inputs of the first group of all levels.

5. Apparatus as defined in claim 2, and further comprising a plurality of networks wherein the output from the last group of a level of groups of one network can selectively drive the inputs of the first group of all levels of another network.

6. Apparatus as defined in claim 1, and further comprising data processing means, including
   (a) three selector devices (A, B, C) each of which includes a plurality of data inputs, a plurality of first command inputs ($F_{1-n}$) and an output, each of said selector devices selecting on each clock pulse one of new data in and previously calculated data in accordance with a command from said command inputs;
   (b) a functional unit connected with the outputs of said selector devices for computing arithmetic and logical functions of the data from said selector devices to produce an output;
   (c) means for selectively routing the functional unit output to one of a selector memory device input, another processor, and memory; and
   (d) means for selectively storing newly calculated data and original data in accordance with external commands.

7. Apparatus as defined in claim 6, wherein said selector devices comprise multiplexers.

8. Apparatus as defined in claim 7, wherein said data inputs receive new data from memory, new data from other processors, previously calculated data routed back from said functional unit output, and a forced data output under command control.

9. Apparatus as defined in claim 8, wherein said functional unit comprises an arithmetic logic unit.

10. Apparatus as defined in claim 9, wherein said arithmetic logic unit performs sum, carry, and string compare functions.

* * * * *